United States Patent
Kim

(10) Patent No.: US 7,612,526 B2
(45) Date of Patent: Nov. 3, 2009

(54) BATTERY MODULE HAVING COUPLED CASES OF ADJACENT UNIT BATTERIES

(75) Inventor: Yong-Sam Kim, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 356 days.

(21) Appl. No.: 11/390,609

(22) Filed: Mar. 27, 2006

(65) Prior Publication Data

US 2006/0220615 A1     Oct. 5, 2006

(30) Foreign Application Priority Data

Mar. 29, 2005  (KR) ..................... 10-2005-0025915

(51) Int. Cl.
*H01M 10/46* (2006.01)
(52) U.S. Cl. ..................................... 320/107
(58) Field of Classification Search .................. 320/107, 320/110, 116, 150, 112; 429/96, 97, 98, 429/99, 100
See application file for complete search history.

(56) References Cited

U.S. PATENT DOCUMENTS

| | | | |
|---|---|---|---|
| 3,745,048 A | 7/1973 | Dinkler et al. | |
| 5,510,203 A | 4/1996 | Hamada et al. | |
| 6,033,800 A | 3/2000 | Ichiyanagi et al. | |
| 6,365,297 B1 | 4/2002 | Wolczak et al. | |
| 6,517,966 B1 | 2/2003 | Marukawa et al. | |
| 7,291,423 B2 * | 11/2007 | Kajiya et al. | ................ 429/160 |
| 2002/0028375 A1 | 3/2002 | Morishita et al. | |
| 2004/0247996 A1 * | 12/2004 | Smith et al. | ................... 429/86 |
| 2005/0181242 A1 | 8/2005 | Suzuki et al. | |

FOREIGN PATENT DOCUMENTS

| | | |
|---|---|---|
| CN | 1291796 A | 4/2001 |
| CN | 1310484 A | 8/2001 |
| CN | 2570991 Y | 9/2003 |
| DE | 23 54 150 A1 | 5/1975 |
| JP | 8-321329 | 12/1996 |
| JP | 09-120809 | 5/1997 |
| JP | 10-106637 | 4/1998 |
| JP | 2000-251953 | 9/2000 |
| JP | 2000-357499 | 12/2000 |
| JP | 2001-229901 | 8/2001 |
| JP | 2001-283937 | 10/2001 |
| JP | 2004-047426 | 2/2004 |
| KR | 1998-025149 | 7/1998 |

(Continued)

OTHER PUBLICATIONS

Patent Abstracts of Japan, Publication No. 2001-229901, dated Aug. 24, 2001, in the name of Toyohiko Eto.

(Continued)

*Primary Examiner*—Edward Tso
(74) *Attorney, Agent, or Firm*—Christie, Parker & Hale, LLP

(57) ABSTRACT

A battery module includes a plurality of unit batteries and a coupling unit for coupling the cases of adjacent unit batteries to each other. The coupling unit includes coupling members formed on an outer surface of a case of each unit battery.

17 Claims, 9 Drawing Sheets

FOREIGN PATENT DOCUMENTS

KR        1998-053626        10/1998

OTHER PUBLICATIONS

U.S. Office action dated Feb. 8, 2008, for related U.S. Appl. No. 11/229,363, noting U.S. references listed in this IDS, namely U.S. Patent 6,033,800 and U.S. Publication 2005/0181242.

U.S. Office action dated Dec. 24, 2008, for related U.S. Appl. No. 11/229,363, noting U.S. reference listed in this IDS, namely U.S. Patent 3,745,048.

Patent Abstracts of Japan, Publication No. 08-321329, dated Dec. 3, 1996, in the name of Hideki Okajima et al.

Patent Abstracts of Japan, Publication No. 09-120809, dated May 6, 1997, in the name of Shinji Hamada et al.

Patent Abstracts of Japan, Publication No. 10-106637, dated Apr. 24, 1998, in the name of Nobuyasu Morishita et al.

Patent Abstracts of Japan, Publication No. 2000-251953, dated Sep. 14, 2000, in the name of Mitsugi Takagi et al.

Patent Abstracts of Japan, Publication No. 2000-357499, dated Dec. 26, 2000, in the name of Takashi Ito et al.

Patent Abstracts of Japan, Publication No. 2001-283937, dated Oct. 12, 2001, in the name of Kiwamu Inu et al.

Patent Abstracts of Japan, Publication No. 2004-047426, dated Feb. 12, 2004, in the name of Shinji Hamada et al.

Chinese Patent Publication CN 100502123 C, dated Jun. 17, 2009, for corresponding Chinese application 200610082067.X noting listed references in this IDS, as well as U.S. Patent 6,365,297 previously filed in an IDS dated May 29, 2008.

\* cited by examiner

BATTERY MODULE HAVING COUPLED CASES OF ADJACENT UNIT BATTERIES

CROSS-REFERENCE TO RELATED APPLICATION

This application claims priority to and the benefit of Korean Patent Application No. 10-2005-25915 filed on Mar. 29, 2005, in the Korean Intellectual Property Office, the entire content of which is incorporated herein by reference.

BACKGROUND OF THE INVENTION

1. Field of the Invention

The present invention relates to a battery module, and more particularly, to a battery module having an improved coupling structure.

2. Description of the Related Art

Recently, a high output rechargeable battery (hereinafter referred as "unit battery") using nonaqueous electrolyte having high energy density has been developed. A battery module having a plurality of unit batteries is used as a power source for driving motors, such as those of hybrid electric vehicles.

Depending on their external shape, unit batteries may be classified into different types, for example, prismatic and cylindrical types. The prismatic type unit battery includes an electrode assembly having positive and negative electrodes and a separator interposed between the positive and negative electrodes, a case for receiving the electrode assembly, a cap plate for sealing the case, and positive and negative terminals extending from the cap plate and electrically connected to the positive and negative electrodes, respectively.

Unit batteries are arranged in series to form a battery module. Adjacent batteries in the battery module are connected by a connecting member. More specifically, each of the negative and positive terminals is typically provided with a screw hole to which a nut member is screw-coupled. The nut members of the negative and positive terminals are connected by the connecting member.

A pair of end plates are typically arranged on outermost side portions of the unit batteries and restraint rods are coupled to the end plates. Therefore, the unit batteries are fixedly pressed and assembled by the end plates.

In conventional battery modules, unit batteries are assembled with each other merely in compression by coupling pressure generated by the restrain rod. Thus, the assembled unit batteries can be easily decoupled when an external force is applied thereto.

Additionally, in a conventional battery module, cell barriers may be provided between the unit batteries to define a flow channel for a heat transfer medium such as cool air. The cell barriers are typically spaced apart from each other by a constant distance to properly define the flow channel.

However, when the structure of the unit batteries varies due to external force, the distance between the cell barriers also varies, thus disrupting the flow channel. In this case, the temperature of the unit batteries excessively increases since the heat transfer medium cannot effectively pass through the unit batteries, causing malfunction of the battery module.

SUMMARY OF THE INVENTION

The present invention provides a battery module in which a coupling structure between unit batteries is enhanced.

According to one embodiment of the present invention, a battery module includes a plurality of unit batteries, each of the unit batteries having a unit battery case containing an electrode assembly, and a coupling unit being formed on an outer surface of a case of each unit battery, the coupling unit coupling the cases of adjacent unit batteries of the plurality of unit batteries to each other.

The unit battery may include one or more cell barriers protruding from the unit battery case and defining a flow channel for a heat transfer medium, the cell barriers being formed on the case of the unit battery.

The coupling unit may include first coupling members formed on the case of one unit battery and spaced from each other; and second coupling members formed on the case of an adjacent unit battery and spaced from each other, wherein a surface of the first fixing members contacts a surface of the respective second fixing members.

The cell barriers formed on the case may be spaced from each other by a predetermined distance.

Alternatively, the coupling unit may include a rib formed on the case of one of the adjacent unit batteries; and a holder formed on the case of the other one of the adjacent unit batteries and coupled to the rib. The holder fixedly may support opposite surfaces of the rib.

Alternatively, the coupling unit may include a first female connector formed on the case of one of the adjacent unit batteries; and a first male connecter formed on the case of the other one of the unit batteries and coupled to the female connector. The coupling unit may also include a second male connector formed on the case on which the first female connector is formed. The coupling unit may further include a second female connector formed on the case on which the first male connector is formed.

The cell barriers closely contact the case of the adjacent unit battery to define the flow channel. The cell barriers formed on one of the adjacent unit batteries may be arranged to alternate with the cell barriers formed on the other one of the adjacent unit batteries and the cell barriers may be spaced apart from each other by a predetermined distance.

The cell barriers formed on one of the adjacent unit batteries may be coupled to the corresponding cell barriers formed on the other one of the adjacent unit batteries through a male-female coupling manner.

A case is formed in a tube shape having opened top and bottom that are closed by top and bottom cap plates on which positive and negative terminals are formed, respectively.

The battery module may further include an insulation film interposed between the unit batteries.

DETAILED DESCRIPTION

Figure 1:
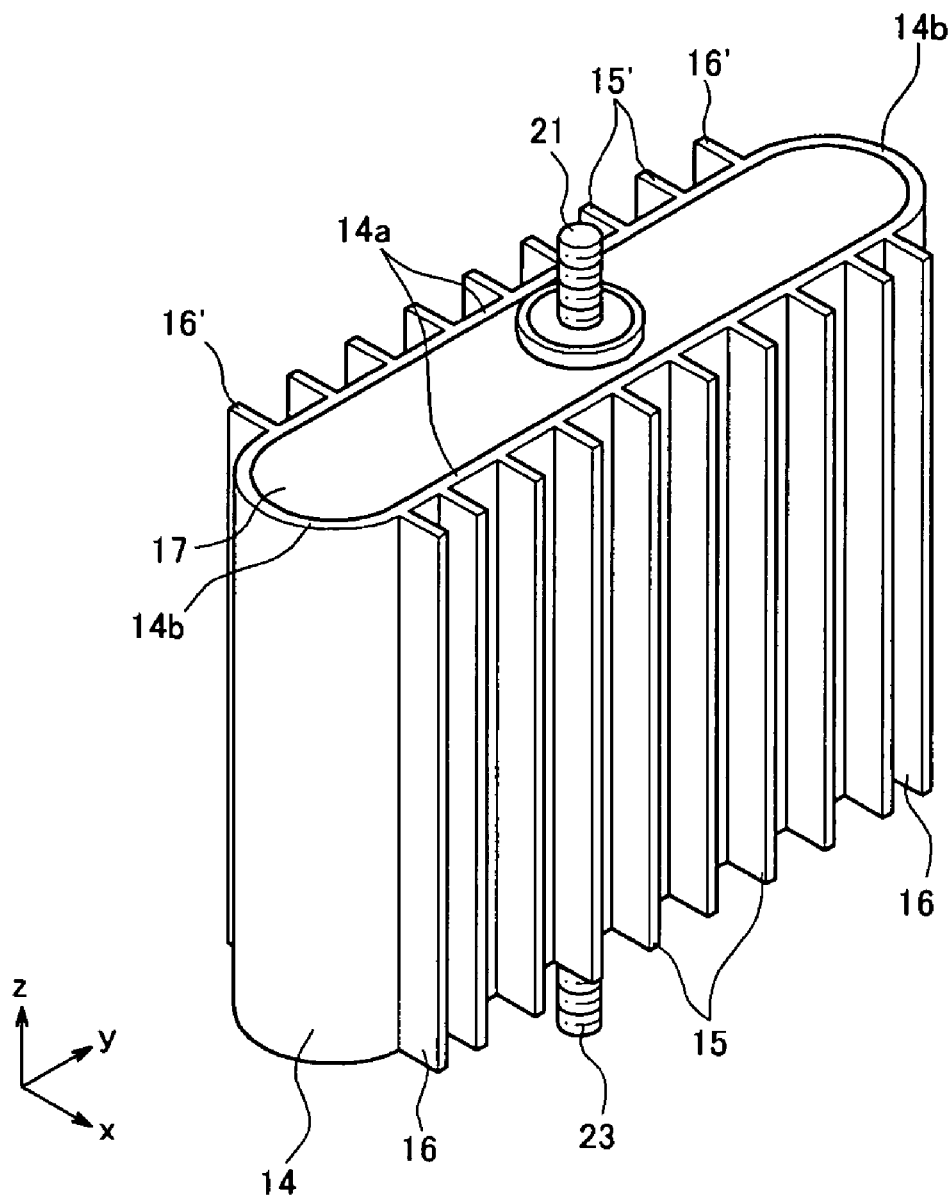
FIG. 1 is a perspective view of a unit battery according to one embodiment of the present invention.
Figure 2:
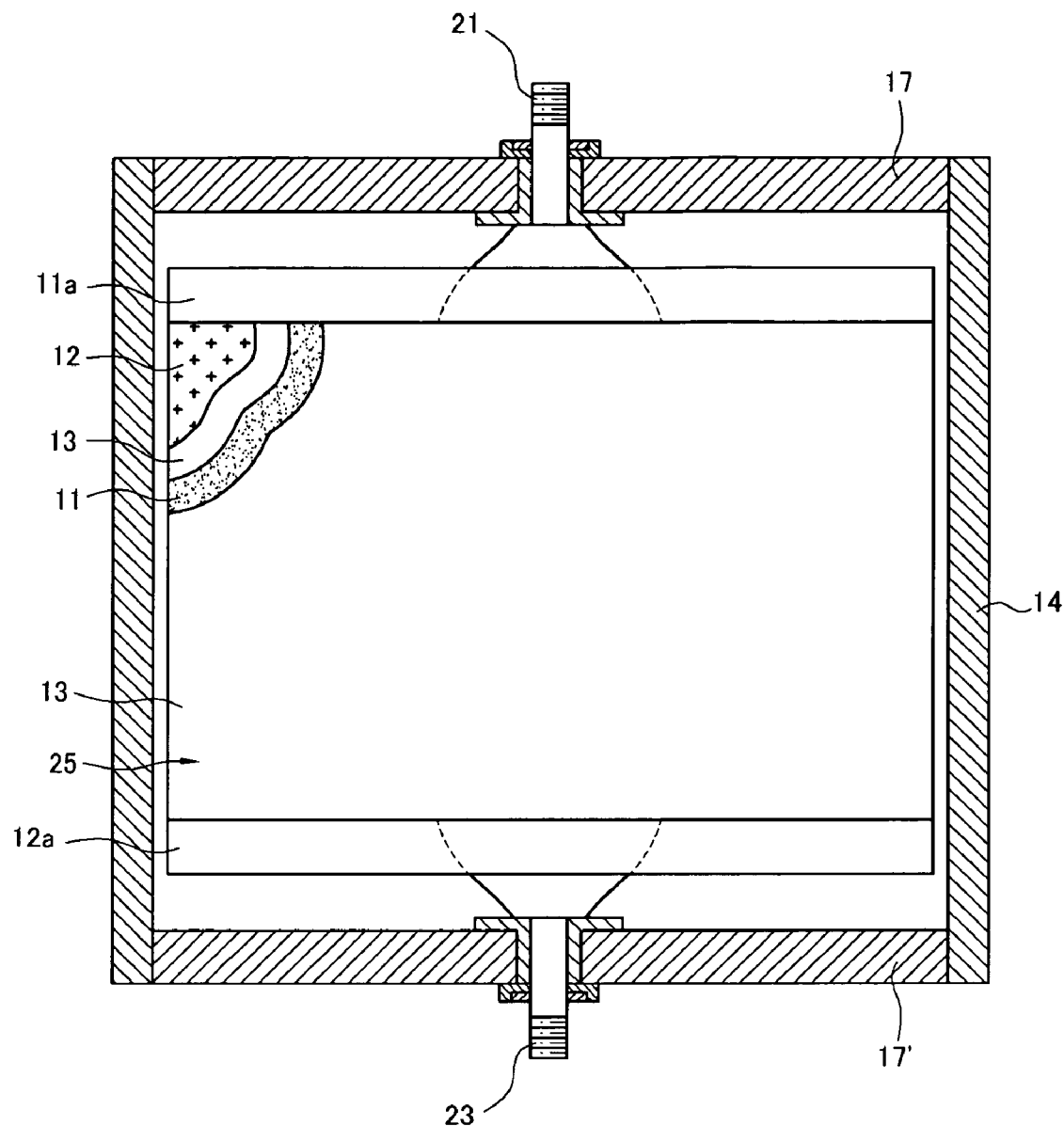
FIG. 2 is a sectional view of the unit battery of FIG. 1.

Referring to FIGS. 1 and 2, a unit battery of an exemplary embodiment of the present invention includes an electrode assembly 25 having positive and negative electrodes 11, 12 and a separator 13 disposed between the positive and negative electrodes 11, 12, a case 14 for receiving the electrode assembly 25, cap plates 17, 17' for sealing the case 14, and positive and negative terminals 21, 23 electrically connected to the positive and negative electrodes 11, 12 and extending from the cap plates 17, 17', respectively.

The case 14 may be formed of conductive metal such as aluminum, an aluminum alloy or nickel-plated steel. In one embodiment, the case 14 includes opposing flat sections 14a and opposing rounded sections 14b connecting the flat sections 14a. The case 14 is formed in an ellipsoid shape, such as a tube, having opened end regions.

The cap plates 17, 17' on which the positive and negative terminals 21, 23 are respectively formed are coupled to either opened end region of the case 14 to seal the case 14. However, the present invention is not limited to the described case. Any structures well known in the rechargeable battery field may be used.

A plurality of cell barriers 15, 15' are formed on planar surfaces of the case 14. In this embodiment, the cell barriers 15, 15' are spaced from each other by a constant distance and run in a longitudinal direction (in a direction of a Z-axis in FIG. 1). The cell barriers 15 formed on a first planar surface of the case 14 are arranged to be located equidistant between adjacent cell barriers 15' formed on a second planar surface of the case 14. Therefore, the cell barriers of adjacent unit batteries in the battery module are alternately disposed.

A coupling unit is formed on the case 14. The coupling unit includes coupling members 16, 16' formed on both planar surfaces of the case 14 to couple adjacent unit batteries to each other. In this embodiment, the coupling members 16, 16' are substantially similar in shape to the cell barriers 15, 15' and are located adjacent to cell barriers 15, 15'. More specifically, the coupling members 16, 16' are formed on both planar surfaces of the case 14 at a junction of the flat section 14a and the rounded section 14b.

Figure 3:
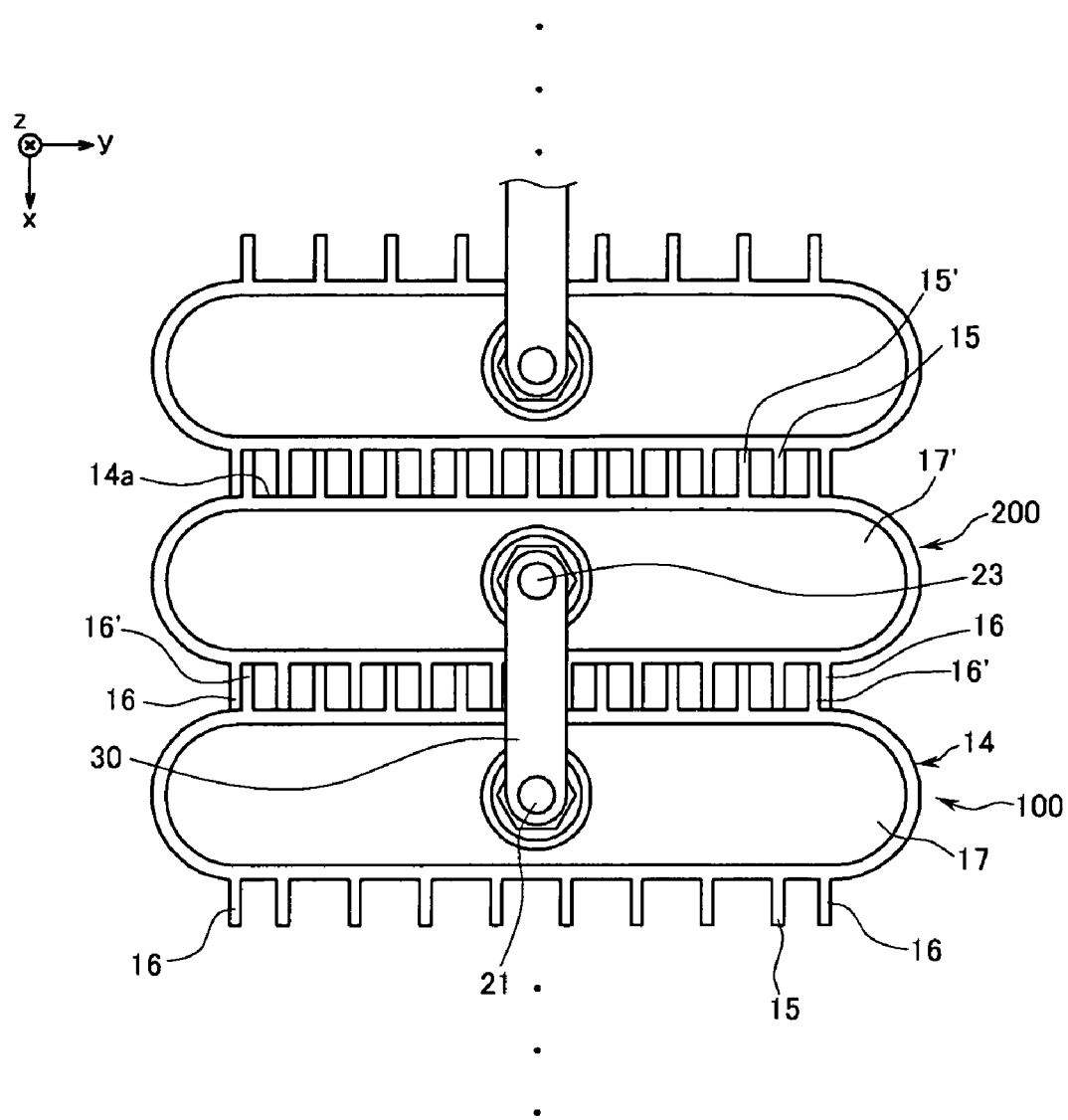
FIG. 3 is a partial top view of a battery module according to one embodiment of the present invention.

As shown in FIG. 3, a battery module includes a plurality of the unit batteries of FIG. 1 and a housing (not shown) for receiving the unit batteries. A heat transfer medium such as cool air may pass through the housing. The facing coupling members 16, 16' are located such that when adjacent unit cells are connected, a side of a first coupling member 16 is aligned with a side of a second coupling member 16'.

When a battery module is formed by combining unit batteries, the unit batteries are arranged in series such that the positive and negative terminals thereof are alternately aligned. As shown in FIG. 3, a positive terminal 21 is connected to an adjacent negative terminal 23 by a conductive connecting member 30.

Referring still to FIG. 3, adjacent unit batteries 100, 200 are arranged such that the cell barriers 15 of the unit battery 100 alternate with the cell barriers 15' of the unit battery 200. That is, the cell barriers 15 of the unit battery 100 contact the flat portion 14a of the unit battery 200 while the cell barriers 15' of the unit battery 200 contact the flat portion 14a of the unit battery 100.

By the arrangement of the cell barriers 15', 15, channels through which the heat transfer medium can pass are defined between the cell barriers 15', 15.

In addition, the coupling members 16' of the unit battery 100 contact the coupling members 16 of the unit battery 200. Based on the arrangement between the coupling members 16', 16, the unit batteries 100, 200 can be securely coupled to each other by an interference fit.

However, locations of the coupling members are not limited to the above-described embodiment. Rather, the coupling members may be formed at any location such that they can couple adjacent unit batteries to each other.

Figure 4:
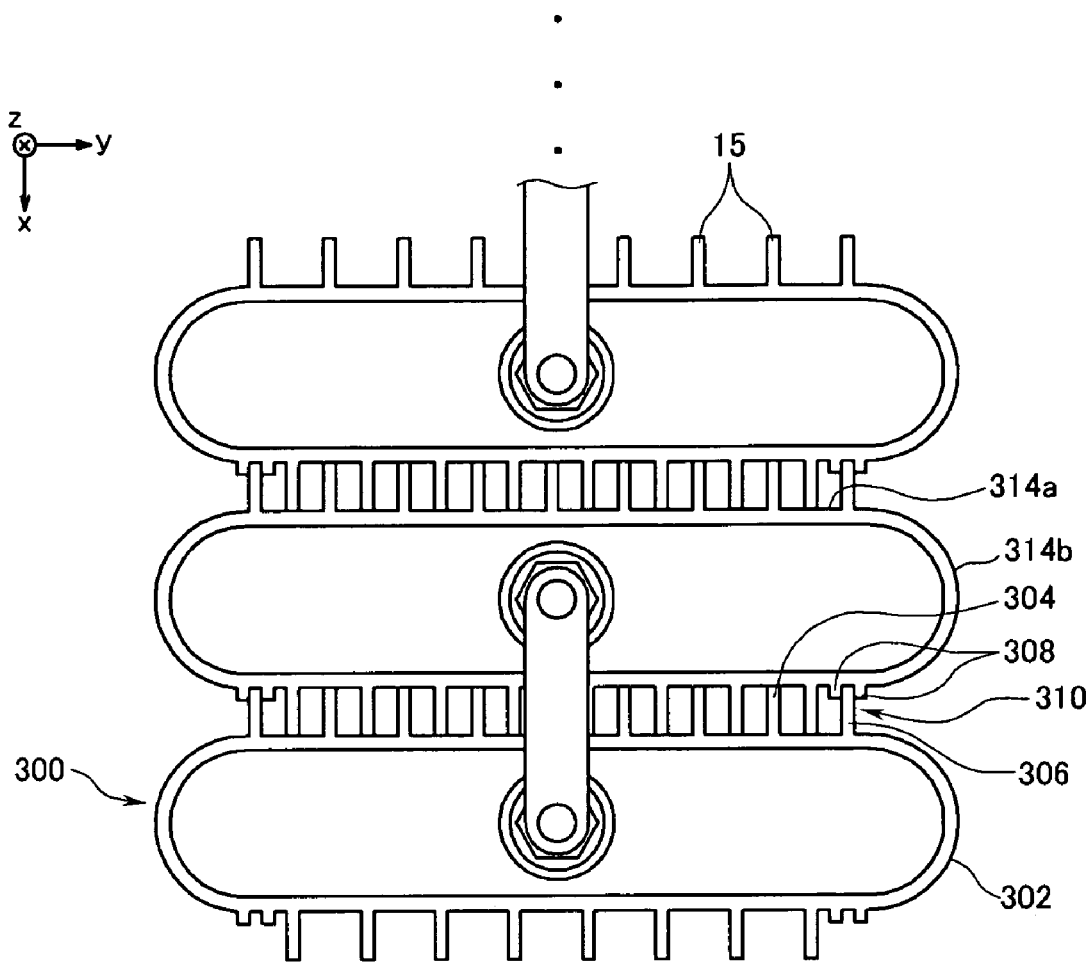
FIG. 4 is a partial top view of a battery module according to another embodiment of the present invention.

As shown in FIG. 4, a battery module of this embodiment is substantially similar to the previous embodiment except for a coupling structure between the unit batteries. For convenience, only the coupling structure will be described with respect to this embodiment.

A coupling unit 310 of this embodiment includes a rib 306 formed on a first planar surface of a case 302 of each unit battery 300 and a holder 308 protruding from a second surface of the case 302. The rib 306 on a first battery is engageable with the corresponding holder 308 on an adjacent battery such that the adjacent unit batteries can be coupled to each other.

In this embodiment, the ribs 306 and holders 308 are formed on both planar surfaces of the case 302 near a junction of a flat portion 314a and a rounded portion 314b. The rib 306 is fitted in the corresponding holder 308 such that opposing side surfaces of the rib 306 can be supported by the holder 308.

The unit batteries 300 of the battery module are arranged in series and may be coupled to each other by the coupling units 310.

Figure 5:
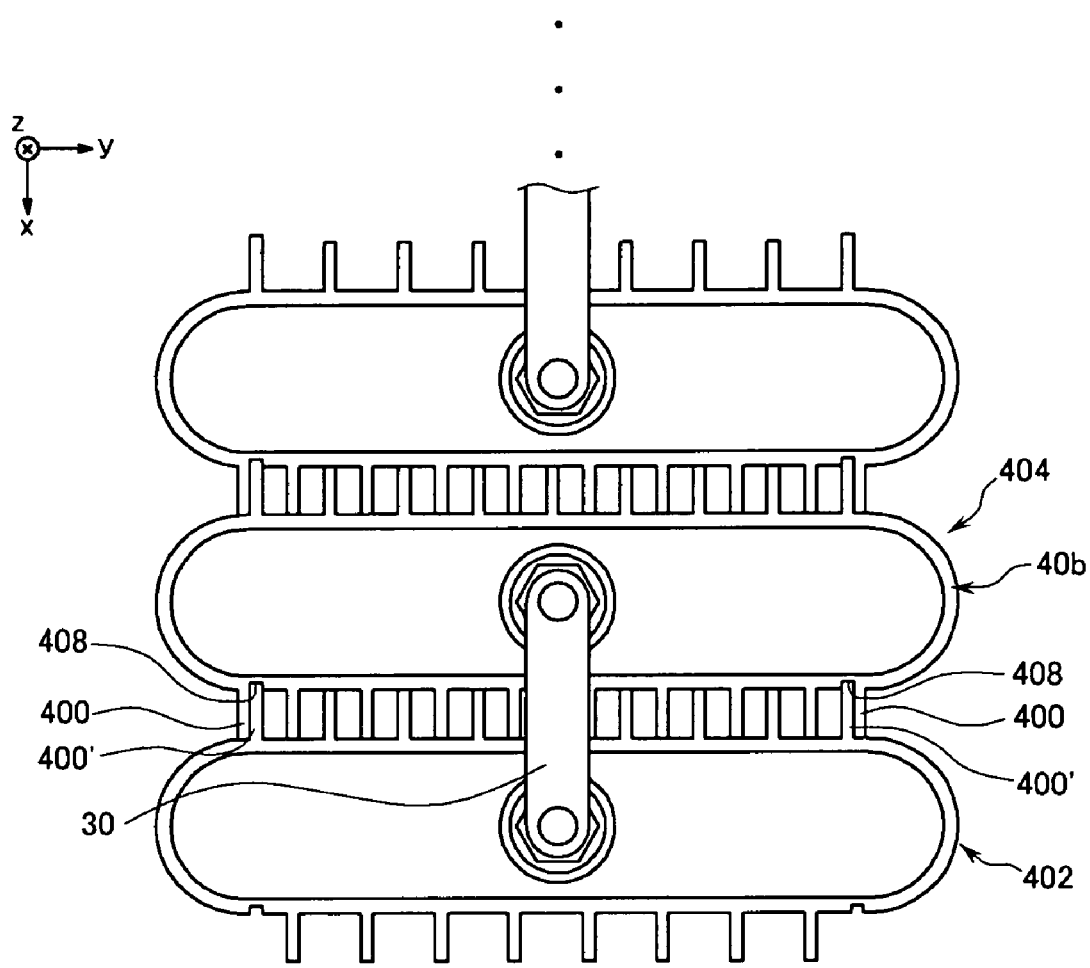
FIG. 5 is a partial top view of a battery module according to yet another embodiment of the present invention.

As shown in FIG. 5, a battery module of another exemplayr embodiment is sudstantially similar to previously described embodiments except for a coupling structure between the unit batteries. Coupling members 400, 400' of this embodiment are substantially similar to those previously described. However, in this embodiment, when the coupling members 400' of a unit battery 402 are coupled to the coupling members 400 of an adjacent unit battery 404, the coupling members 400' of the battery 402 are fitted in grooves 408 as will as by the compression force between the coupling members 400, 400', In FIG.5, although only the coupling members 400' are fitted in the grooves 408, the present invention is not limited to this case. Both coupling members 400, 400' may be fitted into corresponding grooves on unit batteries 402, 404. When both the coupling members 400, 400' are fitted in the corresponding grooves, the coupling force between the unit batteries may be further enhanced.

wherein a side surface of each of the first coupling members is interference fit with a side surface of each of the respective second coupling members.

Figure 6:
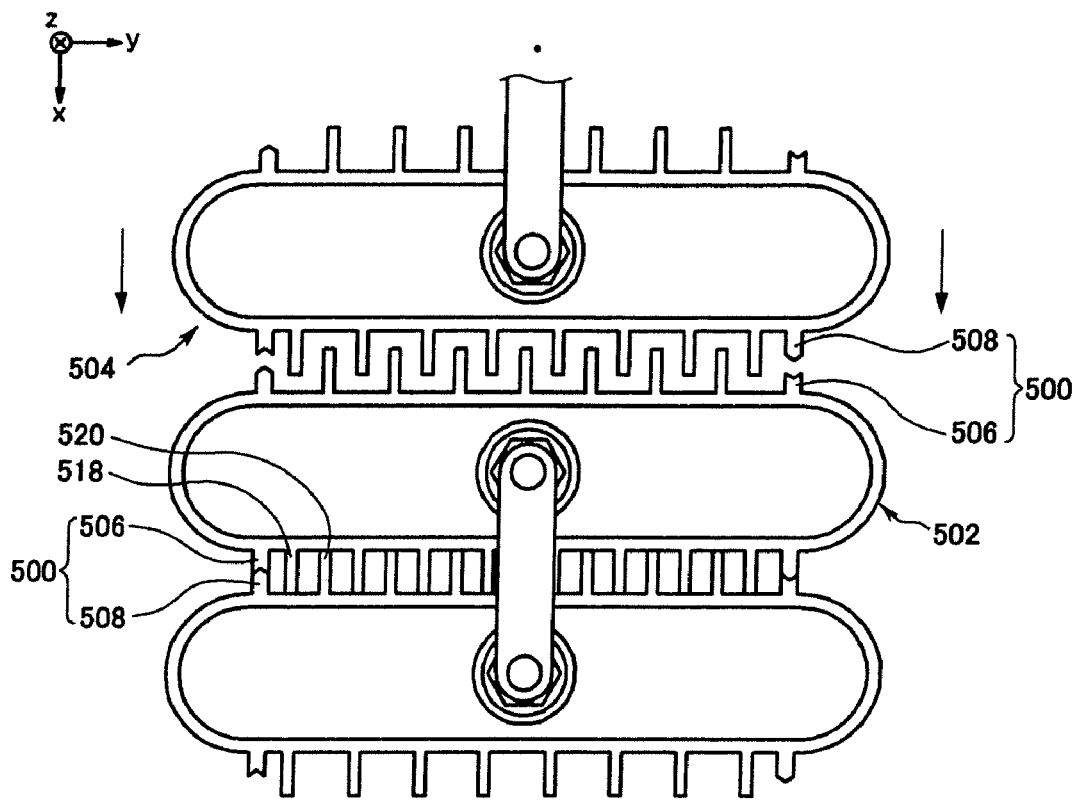
FIG. 6 is a partial top view of a battery module according to still another embodiment of the present invention.

Referring now to FIG. 6, a battery module according to yet another exemplary embodiment is substantially similar to that of the previously described embodiments except for a coupling structure between the unit batteries. For convenience, only a coupling structure will be described with respect to this embodiment.

A coupling unit 500 is formed on each of adjacent unit batteries 502, 504 and includes female connectors 506 and corresponding male connectors 508 that fit into the female connectors 506. When the unit batteries 502 and 504 are arranged in series in the battery module, the female connectors 506 of the unit battery 502 face the male connectors 508 of the unit battery 504.

Figure 7:
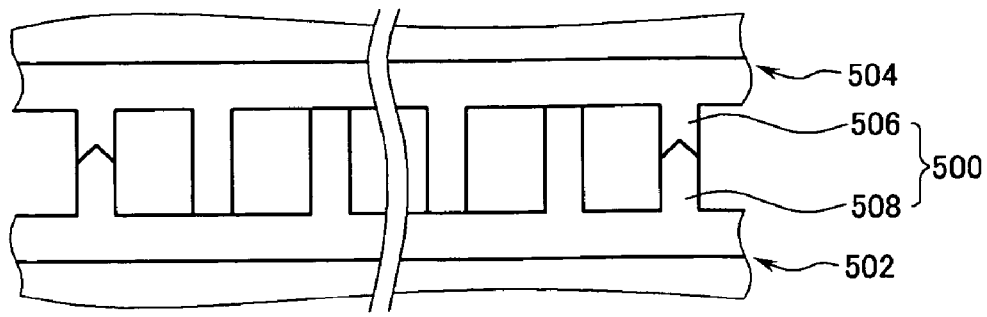
FIGS. 7, 8 and 9 are partial top views of a variety of modified examples of a coupling unit of FIG. 6.

As shown in FIG. 6, one female connector 506 and one male connector 508 may be formed on each planar surface of unit batteries 502, 504 such that the female and male connectors 506, 508 of the unit battery 502 are engageable with corresponding male and female connectors 508, 506 formed on the facing planar surface of adjacent unit battery 504. Alternatively, as shown in FIG. 7, the unit battery 502 may contain only male connectors 508 and the unit battery 504 may contain only female connectors 506.

Figure 8:
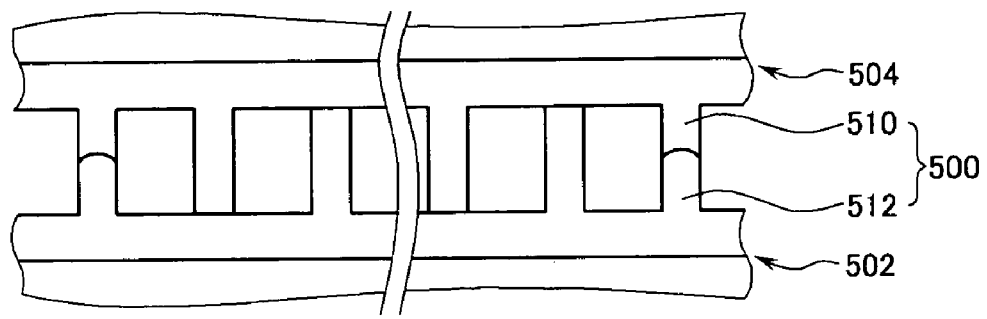
Figure 9:
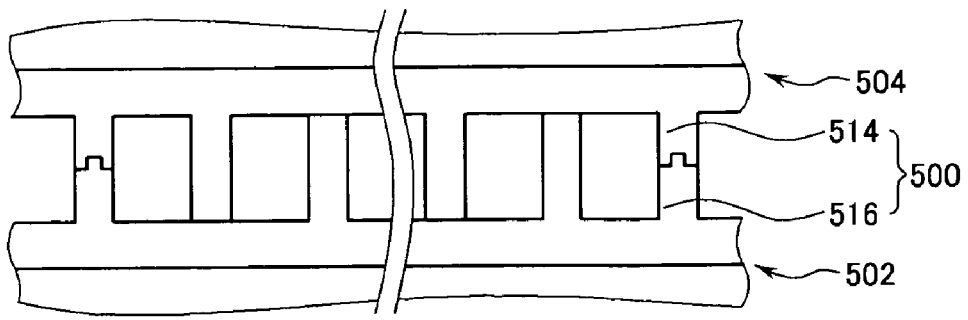

Furthermore, the female and male connectors may be formed in a variety of structures. For example, as shown in FIG. 8, ends of female and male connectors 510, 512 may be respectively provided with a rounded groove and a corresponding rounded projection. In addition, as shown in FIG. 9, ends of female and male connectors 514, 516 may be respectively provided with a rectangular groove and a corresponding rectangular projection. However, the present invention is not limited to these examples. That is, the female and male connectors may be formed in any structures such that the connectors can fixedly couple the unit batteries to each other.

In addition, a thickness of each of the female and male connectors 506, 508 may be greater than that of each of cell barriers 518, 520 (see FIG. 6). This structure provides greater contact area between the female and male connectors 506, 508 allowing more secure coupling between the unit batteries.

In FIGS. 6 through 9, although the coupling units are arranged on both side end portions of the unit battery, the present invention is not limited to this arrangement.

Figure 10:
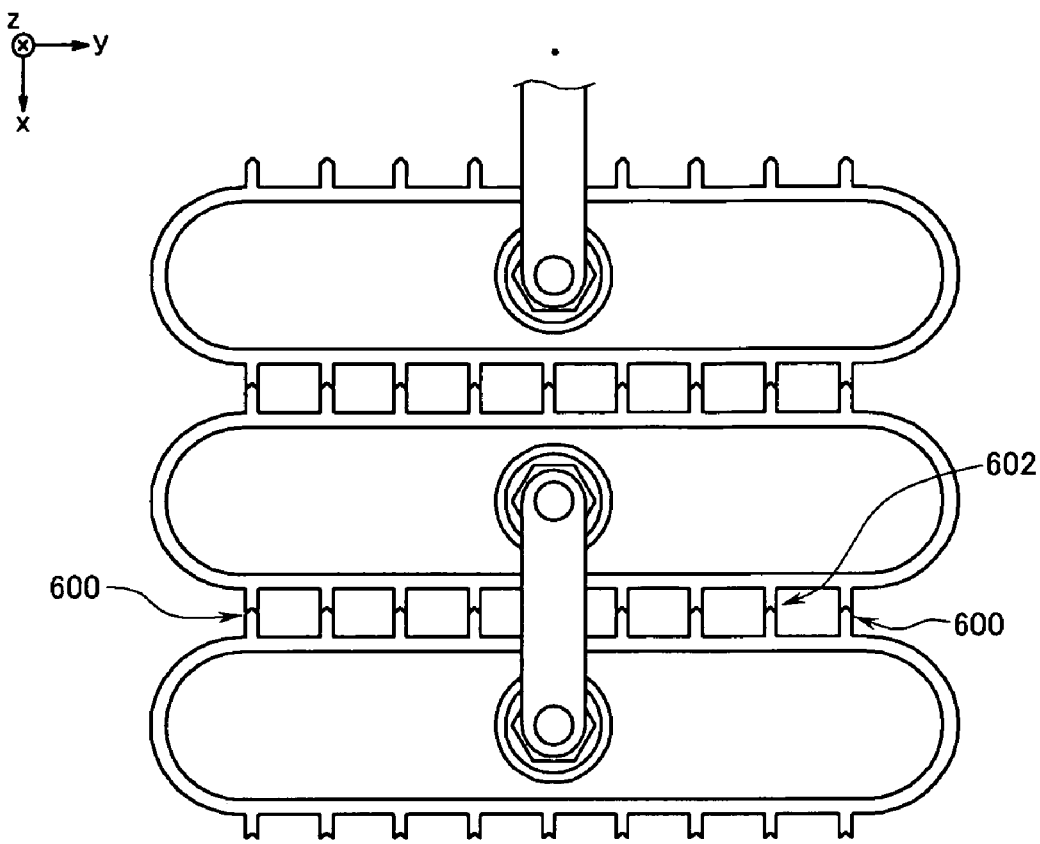
FIG. 10 is a partial top view of a battery module according to a modified example of another embodiment of the present invention.

FIG. 10 is a view of yet another exemplary embodiment of the present invention. In this embodiment, a coupling unit 600 is substantially similar to that previously described and cell barriers 602 are formed in a structure corresponding to the coupling unit 600. More specifically, the cell barriers 602 of this embodiment also function as coupling units. Therefore, the unit batteries of the battery module can be more securely coupled to each other.

Figure 11:
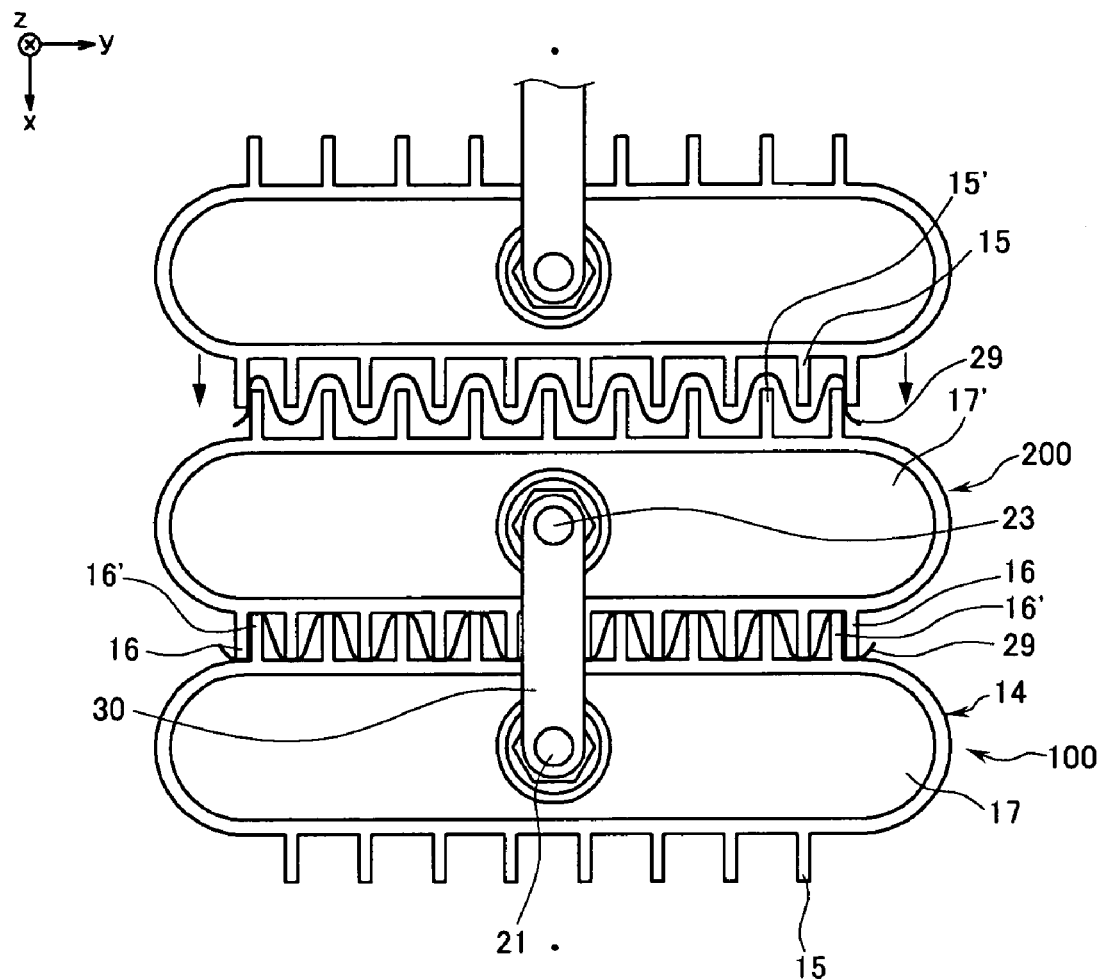
FIG. 11 is a partial top view illustrating an insulation film interposed between unit batteries of the battery module of FIG. 3.

In order to prevent a short circuit between the unit batteries, insulation film 29 may be interposed between the unit batteries as shown in FIG. 11. For example, the insulation film 29 is inserted in a space defined between the cell barriers 15, 15' and coupling members 16, 16' to electrically insulate the unit batteries as described above with reference to FIG. 3 from each other while not deteriorating inherent functions of the cell barriers and coupling members. However, insulation film may be inserted between any adjacent batteries described in the present application.

The battery modules according to the foregoing embodiments may be used as the power source for driving motors, such as motors for hybrid electric vehicles, electric vehicles, electric scooters, electric bicycles, wireless vacuum cleaners, or the like.

According to the present invention, since the unit batteries of the battery module are coupled to each other by the coupling units formed on the outer surfaces of the unit batteries, the unit batteries are securely arranged in a battery module. Therefore, the malfunction of the battery module caused by the decoupling of the unit batteries can be prevented.

While the invention has been described in connection with certain exemplary embodiments, it will be understood by those skilled in the art that the invention is not limited to the disclosed embodiments, but rather is intended to cover various modifications included within the spirit and scope of the appended claims and equivalents thereof.

What is claimed is:

1. A battery module comprising a plurality of unit batteries, each of the unit batteries having a unit battery case containing an electrode assembly coupled to a first terminal and a second terminal, and a coupling unit on an outer surface of each unit battery case and spaced from the first and second terminals, the coupling unit coupling the unit battery cases of adjacent unit batteries of the plurality of unit batteries to each other and constraining the adjacent unit batteries relative to each other in a direction substantially parallel to the outer surfaces.

2. The battery module of claim 1, wherein each unit battery case includes a plurality of cell barriers protruding from the unit battery case and defining a flow channel for a heat transfer medium.

3. A battery module comprising a plurality of unit batteries, each of the unit batteries having a unit battery case containing an electrode assembly, and a coupling unit on an outer surface of each unit battery case, the coupling unit coupling the unit battery cases of adjacent unit batteries of the plurality of unit batteries to each other, wherein the coupling unit includes:
    plurality of first coupling members on the unit battery case of a first unit battery, the plurality of first coupling members being spaced from each other; and
    a plurality of second coupling members on the unit battery case of a second unit battery, the plurality of second coupling members being spaced from each other;
    wherein the first unit battery is adjacent to the second unit battery; and
    wherein a side surface of each of the first coupling members is interference fit with a side surface of each of the respective second coupling members.

4. The battery module of claim 2, wherein adjacent cell barriers are spaced from each other by a constant distance.

5. The battery module of claim 1, wherein the coupling unit includes:
    a rib on a first unit battery case; and
    a holder on a second unit battery case and coupled to the rib;
    wherein the first unit battery case is adjacent to the second unit battery case.

6. The battery module of claim 5, wherein the holder fixedly supports opposing side surfaces of the rib.

7. The battery module of claim 1, wherein the coupling unit includes:
    a first female connector on a first unit battery case; and
    a first male connecter on a second unit battery case, the first male connector corresponding to the first female connector;
    wherein the first unit battery case is adjacent to the second unit battery case; and
    wherein the first female connector is coupled to the first male connector.

8. The battery module of claim 7, wherein the coupling unit further includes a second male connector on the first unit battery case.

9. The battery module of claim 7, wherein the coupling unit further includes a second female connector on the second unit battery case.

10. The battery module of claim 2,
    wherein cell barriers of a first unit battery case contact a second unit battery case to define the flow channel; and
    wherein the first unit battery case is adjacent to the second unit battery case.

11. The battery module of claim 10, wherein the cell barriers of the first unit battery case are adjacent to and in contact with corresponding cell barriers of the second unit battery case, wherein the cell barriers of the first unit battery case and the cell barriers of the second unit battery case are spaced from each other by a constant distance.

12. The battery module of claim 2, wherein cell barriers of a plurality of cell barriers of a first unit battery case are coupled to corresponding cell barriers of a plurality of cell barriers of a second unit battery case in a male-female coupling manner.

13. The battery module of claim 1,
wherein each of the unit battery cases comprises a tube having a first opened end portion and a second open end portion;
the first open end portion being sealed by a first cap plate, the first cap plate having the first terminal thereon;
the second open end portion being sealed by a second cap plate, the second cap plate having the second terminal thereon.

14. The battery module of claim 1, further comprising an insulation film between adjacent unit batteries.

15. A battery module comprising a plurality of unit batteries, each of the unit batteries having a unit battery case containing an electrode assembly, and at least one coupling unit on an outer surface of each unit battery case of at least one pair of adjacent unit batteries of the plurality of unit batteries, the at least one coupling unit coupling the unit battery cases of the at least one pair of adjacent unit batteries to each other, wherein the at least one coupling unit comprises:
 a first coupling member protruding from the unit battery case of a unit battery of a pair of the at least one pair of adjacent unit batteries, the first coupling member having a surface facing a first direction;
 a second coupling member protruding from the unit battery case of the other unit battery of the pair of adjacent unit batteries, the second coupling member having a surface facing a second direction opposite the first direction, the surface of the second coupling member in contact with the surface of the first coupling member and constraining the unit battery of the pair of adjacent unit batteries relative to the other unit battery of the pair of adjacent unit batteries in the first direction;
 a third coupling member protruding from the unit battery case of the unit battery of the pair of adjacent unit batteries, the third coupling member having a surface facing the second direction; and
 a fourth coupling member protruding from the unit battery case of the other unit battery of the pair of adjacent unit batteries, the fourth coupling member having a surface facing the first direction, the surface of the fourth coupling member in contact with the surface of the third coupling member and constraining the unit battery of the pair of adjacent unit batteries relative to the other unit battery of the pair of adjacent unit batteries in the second direction.

16. The battery module of claim 15, wherein the at least one coupling unit further comprises another surface on at least one of the first coupling member or the third coupling member, the another surface facing a third direction substantially perpendicular to the first and second directions, the another surface in contact with the unit battery case of the other unit battery of the pair of adjacent unit batteries and constraining the unit battery of the pair of adjacent unit batteries from moving relative to the other unit battery of the pair of adjacent unit batteries in the third direction.

17. The battery module of claim 15, wherein each unit battery case of the at least one pair of adjacent unit batteries comprises a plurality of cell barriers protruding from the unit battery case and contacting an adjacent unit battery case to define at least one flow channel therebetween.

* * * * *

UNITED STATES PATENT AND TRADEMARK OFFICE
CERTIFICATE OF CORRECTION

PATENT NO.        : 7,612,526 B2                                   Page 1 of 1
APPLICATION NO. : 11/390609
DATED             : November 3, 2009
INVENTOR(S)       : Yong-Sam Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

PATENT NO.         : 7,612,526 B2                                        Page 1 of 1
APPLICATION NO.    : 11/390609
DATED              : November 3, 2009
INVENTOR(S)        : Yong-Sam Kim It is certified that error appears in the above-identified patent and that said Letters Patent is hereby corrected as shown below:

In the Claims

Column 6, Claim 3, line 18          Insert --a--
                                    Before "plurality"

Column 7, Claim 13, line 8          Delete "opened"
                                    Insert --open--

Signed and Sealed this
Twenty-second Day of March, 2011

David J. Kappos
*Director of the United States Patent and Trademark Office*